Figure 1:
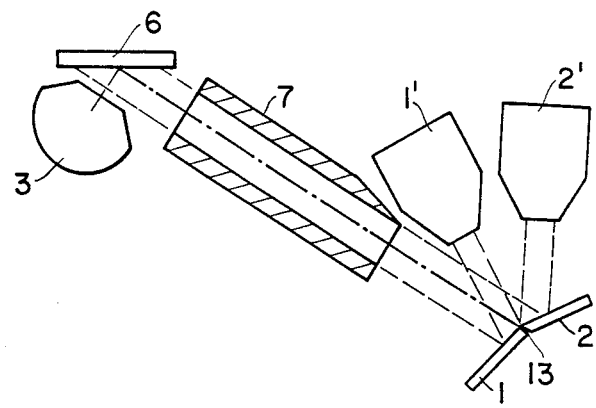

United States Patent [19]

Jenkins et al.

[11] Patent Number: 4,752,945
[45] Date of Patent: Jun. 21, 1988

[54] DOUBLE CRYSTAL X-RAY SPECTROMETER

[75] Inventors: Ron Jenkins, Downingtown, Pa.; Joseph Nicolosi, Bardonia; Al Cruz, Jackson Heights, both of N.Y.

[73] Assignee: North American Philips Corp., New York, N.Y.

[21] Appl. No.: 931,932

[22] Filed: Nov. 17, 1986

Related U.S. Application Data

[63] Continuation of Ser. No. 795,011, Nov. 4, 1985, abandoned.

[51] Int. Cl.$^4$ .................. G01N 23/223; G21K 1/06
[52] U.S. Cl. ............................... 378/49; 378/84; 378/85
[58] Field of Search .................... 378/82-85, 378/49

[56] References Cited

U.S. PATENT DOCUMENTS

| H313 | 7/1987 | Standenmann et al. | 378/85 |
|---|---|---|---|
| 3,160,747 | 12/1964 | De Vries | 378/85 |
| 3,439,163 | 4/1969 | De Jongh | 378/84 |
| 4,236,072 | 11/1980 | Schinkel et al. | 378/83 |
| 4,472,825 | 9/1984 | Jenkins | 378/85 |

Primary Examiner—Craig E. Church
Assistant Examiner—John C. Freeman
Attorney, Agent, or Firm—Paul R. Miller

[57] ABSTRACT

A Dual Channel Spectrometer system is provided for measurement of X-ray spectra in which at least two pairs of crystals are arranged in a crystal changer so that different pairs of such crystals can be selected in the X-ray spectrometer. This selection is achieved by rotating a drum on which pairs of crystals are mounted about an axis to bring one pair of crystals into alignment with a collimated X-ray beam. This enables the selection of the wavelength range used in the spectrometer to be made without deactivating the spectrometer or without loosing the vacuum in the spectrometer.

2 Claims, 1 Drawing Sheet

U.S. Patent

Jun. 21, 1988

4,752,945

DOUBLE CRYSTAL X-RAY SPECTROMETER

This is a continuation of application Ser. No. 795,011, filed Nov. 4, 1985 now abandoned.

The present invention involves an improved double crystal spectrometer in which at least two pairs of crystals for simultaneous measurement of two wavelength ranges can be utilized alternatively.

In U.S. Pat. No. 4,472,825 by Jenkins, one of the present inventors, a double crystal X-ray spectrometer is provided, in which two angularly disposed diffracting crystals are provided for receiving differently collimated X-rays in order to provide simultaneous acquisition of spectroscopic data over two different wavelength ranges. Namely, this prior arrangement involves two crystals and corresponding detectors to simultaneously measure long and short wavelength spectra.

The present invention is an improvement to this previous arrangement by way of forming at least one additional pair of split crystals in a manner to alternatively provide additional wavelength spectra for diffraction.

Namely, each pair of two crystals measures two different wavelength ranges, and each pair of two crystals may be placed in the X-ray beam without having to take a previous double crystal arrangement out of the spectrometer. Such changing of diffraction crystals would normally involve breaking the vacuum in the spectrometer, changing the crystals, and then again evacuating the spectrometer before use.

In accordance with the present invention, different pairs of diffracting crystals are formed on a drum which may be rotated so as to bring one of the different pairs into an X-ray optical path. Such changing of pairs of crystals according to the present invention can be done without breaking the vacuum in the spectrometer and going through a time involved change-over process.

Figure 2:
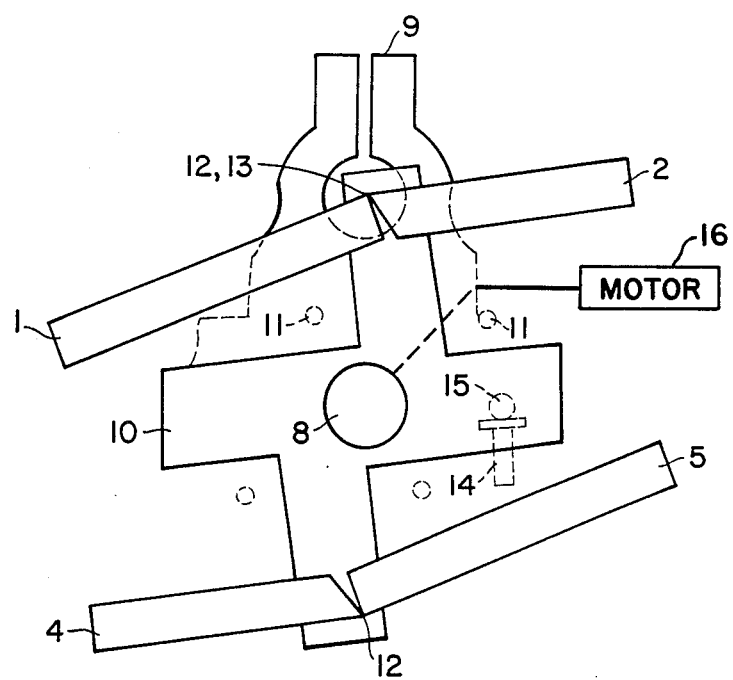

The features of the present invention may be more clearly seen by reference to the drawing figures which illustrate without limitation an aspect and embodiment of the present invention, and wherein:

FIG. 1 illustrates a partial arrangement of the X-ray optics used in the spectrometer system, and FIG. 2 illustrates, in partial schematic view, the crystal changer of the present invention.

In FIG. 1 an X-ray tube 3 directs primary X-rays onto a specimen 6 which in turn generates characteristic spectra from the specimen through, for example, collimator 7 onto a pair of half crystals 1 and 2. The spectra are diffracted from these half crystals to detectors 1' and 2', respectively. The crystals 1 and 2 are mounted edge-on at a surface angle of about 15°. The two detectors 1' and 2' are mounted 30° apart as a single assembly, with detector 1' being aligned with the half crystal 1 and with the detector 2' being aligned with the half crystal 2.

A goniometer (not illustrated) moves the two crystals and the two detectors in the usual 2:1 relationship to maintain the geometrical conditions for two integrated spectrometer channels. The two detectors 1' and 2' typically involve a flow counter detector and a high pressure sealed counter detector with the flow counter detector being aligned to the larger "d" spacing half crystal for long wavelength X-rays, and the sealed counter detector being aligned to the smaller "d" spacing half crystal for short wavelengths.

The features of the present invention may be seen by reference to FIG. 2 in which the crystal changer having at least two pairs of crystals 1 and 2 or 4 and 5 may be seen. In this structure, a motor rotates either crystal pair 1 and 2 or 4 and 5 into the X-ray optical path relative to the X-ray spectra from the specimen 6.

The two pairs of crystals 1,2 and 4,5 (dual channel system), or two single crystals (single channel system), arranged 180° apart, may be mounted on a rotatable support 10. Each crystal can be individually adjusted by adjustment screws 11 for maximum intensity.

Each pair of crystals are hinged together to the rotatable support 10 with two pins 12, one at each side. The pins 12 are pressed into the rotatable support 10 so that the crystals can be adjusted independently without changing the position of the adjacent one.

The crystal changer is driven by a motor 16, such as an electrical micromotor or D.C. gear motor. The stator 8 of the motor 16 is coupled to the rotatable support 10 and rotates while the motor shaft, located on the center of the crystal changer and fastened to a fixed rod, is fixed to a support 9.

The support 9, mounted and clamped to the $\theta$-shaft, holds the fixed rod (not shown), two adjusting screws 14, two signal microswitches (not shown) and a set of electrical contacts (not shown).

The rotation of the crystal changer is limited by a pin 15, pressed into the rotatable support 10, which stops against either of two screws, such as the screw 14, positioned at each side of the support 9. Each of these screws is adjusted so that each of the pins 12 coincides with the $\theta$-$2\theta$ center 13.

The rotation mechanism of the crystal changer is fixed by the support 9 to the $\theta$-axis of the goniometer. Individual adjustment can be made by way of the adjustment screws 11 to set alignment of the crystals relative to the X-ray beam.

What we claim:

1. In an X-ray spectrometer comprising an X-ray source, a specimen receiving X-rays from said source, a collimator for collimating X-rays from said specimen, a pair of diffracting crystals receiving said X-rays from said collimator, and a pair of detectors simultaneously receiving X-rays from said pair of diffracting crystals, the improvment comprising rotatable structure means for rotatably exchanging said pair of diffracting crystals for at least a second pair of diffracting crystals, said second pair of diffracting crystals measuring different wavelength ranges then the proceeding pair of diffracting crystals; electric motor means for rotating said rotatable structure means; and stop means for limiting rotation of said rotatable structure means to adjust said pair of diffracting crystals relative to said X-rays, wherein said pair of diffracting crystals and hinged together by a pin attached to said rotatable structure means.

2. An X-ray spectrometer according to claim 1, wherein each diffracting crystal of said pair of diffracting crystals is individually adjustable in said X-rays by adjustment screws.

* * * * *